Jan. 2, 1945.   J. W. BIGELOW   2,366,380
SHOULDERED TRANSFER CHAIN
Filed April 23, 1943
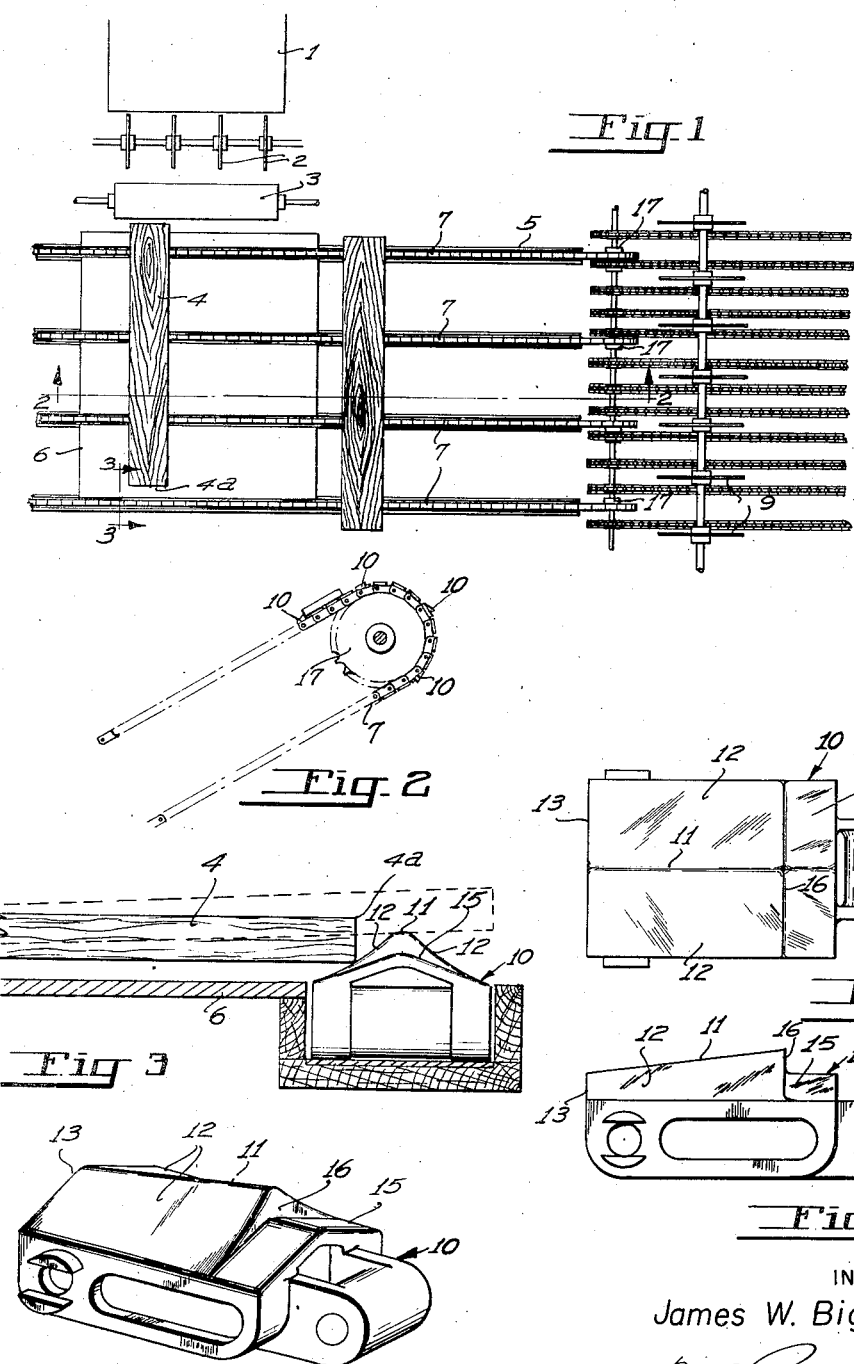
INVENTOR
James W. Bigelow
BY
ATTORNEY Patented Jan. 2, 1945

2,366,380

UNITED STATES PATENT OFFICE 2,366,380

SHOULDERED TRANSFER CHAIN

James W. Bigelow, Seattle, Wash.

Application April 23, 1943, Serial No. 484,155

7 Claims. (Cl. 198—189)

The object of my invention is to provide an improvement in transfer chains for use in sawmills and the like where it is necessary to receive boards or other elongated objects endwise and then to transport said objects crosswise to some destination. Said transfer chains normally are used to make a right angle turn in moving goods by conveyer chains. Said transfer chains are used to permit articles to be slid in endwise and are adapted for use not only in carrying lumber but also in moving boxes, barrels, and the like. Said transfer chain runs in shallow troughs or runways and is provided with a sloping top so that material may be loaded or unloaded from it transversely. It is frequently necessary that said transfer chains operate in a plane inclined at a substantial pitch to horizontal and then the articles being conveyed tend to slide downhill. It has not been deemed practical to provide lugs or other working engaging members on transfer chains because said lugs or shoulders tend to hold up the ends of articles slid endwise on said transfer chains. That is, said chains are made up of a plurality of links of so-called "roof-top" or "camel-back" profile. And it has been deemed impractical to provide lug faces on said "roof-top" or "camel-back" links because said vertical projections would prevent said boards from being slid lengthwise across the chains. Some engagement with the articles being transferred has been accomplished by roughening the upper surfaces of said links as by applying spots of welded materials thereto. Said projections, however, become knocked off or they gouge into and mar the face of boards.

I have been able to provide transfer chains of this character with effective shouldered links by making "roof-top" or "camel-back" links with a longitudinal slope, and arranging the forward end thereof to extend above the trailing end. Said forward end, thus, presents a shoulder which lies substantially above the general plane of the transfer chain to engage the object to be transferred. I preferably arrange said links in transversely aligned pairs or other multiple series and arrange one of said links at a uniform interval such, for example, as one step-type link every twelve links. If the links are four inches long, for example, this would provide one shouldered abutment in each four feet of chain. The transverse contour of the links is unchanged except for the oblique inclination of the ridge, and the base portion of each of the links is the same as in other links. Thus, one of said stepped links can be inserted in a chain without difficulty.

The details of my invention are hereinafter described with reference to the accompanying drawing in which:

Fig. 1 is a more or less diagrammatic plan view of a conveying system such, for example, as would be installed in a sawmill, illustrating one manner in which a transfer chain embodying my invention could be used;

Fig. 2 is a sectional view taken on the line 2—2 in Fig. 1, illustrating how a transfer chain may be made up of links, some of which embody my invention;

Fig. 3 is a view taken on the line 3—3 in Fig. 1 but on an enlarged scale through link of chain embodying my invention, illustrating the manner in which a board easily slides over a "roof-top" type link embodying my invention;

Fig. 4 is a plan view of such link;

Fig. 5 is a side elevation of a link illustrating the manner in which a shoulder is formed thereon; and Fig. 6 is a perspective view of such link.

In Fig. 1 I illustrate diagrammatically one operation involving the use of a transfer chain. A board 1 to be cut into a plurality of narrower boards passes under a series of saws 2 as in a vertical re-saw. A pair of feeder rolls 3 remove said cut boards 4 and feeds them endwise over a transfer chain mechanism 5. Said boards are fed endwise onto said transfer chains, normally from slightly above the horizontal plane of said chains. As the boards pass through said rolls and project substantially beyond their transverse middles, they tend to droop downwardly so that their forward ends 4a strike upon deck 6 which extends across the transfer chain mechanism at the discharge side of the rolls. It is essential that said forward end engage no shoulder or abutment and thus said end must be able to be shifted longitudinally until it is free of the rolls in the manner shown in Fig. 1.

The transfer chain mechanism then takes the board and moves it at right angles to its former course, which is longitudinal of the individual transfer chains 7. It is common practice to make said transfer chains of "camel-back" or "roof-top" profile and the troughs 8 extend upwardly along the sides of the chains substantially to the horizontal level of the sides or eaves of said "roof-top" structure. Thus, as is shown in Fig. 3, said boards are guided by the upper surface of said troughs and the inclined faces of the chains merely cause a board to be lifted over the top of a given chain but do not impede its forward progress across said chains. It is frequently necessary that said transfer chains be inclined upwardly at a relatively steep angle. The pitch of said angle heretofore has been limited to the frictional or mechanical engagement between the transfer chains and the boards carried thereon. The engagement has been increased somewhat by roughening the upper surfaces of said "rooftop" type chain or by spotting metal thereon but if the roughening or spotting is carried to such a degree as to provide substantial engagement, then it prevents the boards from moving endwise over the transfer chains, or else it gouges into the boards and mars their surfaces. The boards normally are lifted upwardly by transfer chains and moved to some other mechanism such, for example, as a trimmer saw mechanism 9 where the boards either are trimmed to length or are cut into a plurality of shorter lengths. This use of transfer chains is not to be construed to limit the field of usefulness of my invention but is intended only to illustrate one use therefor. My invention has as wide a use, substantially, as that of transfer chains generally.

I form the upper surface of certain spaced links 10 so that the ridge 11 thereof is inclined upwardly obliquely, from the base thereof, considered in the direction of the longitudinal dimension thereof. The pitch of the roof portions 12 increases thus from the rear or trailing edge 13 of such link to a point adjacent the forward or leading edge thereof. I provide a section 15 which may either be flat or slightly pitched, as is shown in Figs. 3 and 6. I deem the latter preferable because then the forward edge of said link will line up with the trailing edge of the ordinary transfer link arranged immediately forward of link 10. The forward exposed edge 16, that is the vertical section arranged immediately rearward of section 15, thus forms a board engaging shoulder for engaging a board or other article to be conveyed by said transfer chain in which said links are arranged. It is desirable that the edge 16 have a vertical component only high enough to provide a good engagement with the edge of a board 4, for example. I preferably arrange said links 10 in pairs or in laterally arranged series so as to engage the trailing edge of boards along substantially the entire width of the transfer chain mechanism. Said chains normally extend about sprockets 17 which drive them. Said sprockets all have the same pitch diameter and are secured to a common shaft and, the bases of all links are identical, thus, when the links 10 are originally aligned they stay maintained in alignment except for slight wear and difference in elongation, but these factors do not interfere substantially.

The links composing a transfer chain 7 are normally connected to each other by rivets, bolts or similar mechanisms which provide a pivotal connection between them as well as means for securing the links one with another.

I claim:

1. A transfer chain comprising a series of elongated links joined together by pivotal connections each of said links having a base and a centrally-peaked upper work-engaging surface forming a longitudinally extending ridge, spaced links having their ridges extending obliquely upwardly from their bases, respectively, the end of greater height constituting a work-engaging shoulder and said shoulder facing the forward end of said chain link.

2. A transfer chain comprising a series of elongated links joined together by pivotal connections, each of said links having a base and a centrally-peaked upper work-engaging surface forming a longitudinally extending ridge, certain of said links having their ridges extending obliquely upwardly from their bases, respectively, the end of greater height constituting a work-engaging shoulder and said shoulder facing the forward end of said chain link.

3. A transfer chain comprising a series of elongated links joined together by piovtal connections, each of said links having a base and a centrally-peaked upper work-engaging surface forming a longtudinally extending ridge, certain of said links having their ridges extending obliquely upwardly from their bases, respectively, the end of greater height constituting a work-engaging shoulder, said shoulder facing the forward end of said chain link, and a step lying forwardly of said shoulder.

4. A transfer chain comprising a series of elongated links joined together by pivotal connections, each of said links having a base and a centrally-peaked upper work-engaging surface forming a longitudinally extending ridge, certain of said links having their ridges extending obliquely upwardly from their bases, respectively, the end of greater height constituting a work-engaging shoulder, said shoulder facing the forward end of said chain link, and a peaked step lying forwardly of said shoulder, said step being of the same height as the peaked roof of the adjacent links.

5. A transfer chain link having pivotal connections at the ends thereof and comprising a base having a peaked upper work-engaging surface formed thereon, with a longitudinal ridge extending centrally thereof, said ridge extending obliquely upwardly from the base of said link, with the end of greater height constituting a work-engaging shoulder.

6. A transfer chain link having pivotal connections at the ends thereof and comprising a base having a peaked upper work-engaging surface formed thereon, with a longitudinal ridge extending centrally thereof, said ridge extending obliquely upwardly from the base of said link, with the end of greater height constituting a work-engaging shoulder, and a step lying forwardly of said shoulder.

7. A transfer chain link having pivotal connections at the ends thereof and comprising a base having a peaked upper work-engaging surface formed thereon, with a longitudinal ridge extending centrally thereof, said ridge extending obliquely upwardly from the base of said link, with the end of greater height constitution a work-engaging shoulder, a peaked step lying forwardly of said shoulder, and said step being of the same height as the end of lesser height.

JAMES W. BIGELOW.